United States Patent
Nosu et al.

(10) Patent No.: US 6,313,208 B1
(45) Date of Patent: *Nov. 6, 2001

(54) SYNTHETIC RESIN COMPOSITION HAVING RESISTANCE TO THERMAL DETERIORATION AND MOLDED ARTICLES

(75) Inventors: Tsutomu Nosu; Keiko Katsuki, both of Sakaide (JP)

(73) Assignee: Kyowa Chemical Industry Co Ltd, Kagawa-Ken (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/254,258

(22) PCT Filed: Jul. 2, 1998

(86) PCT No.: PCT/JP98/02990

§ 371 Date: Mar. 4, 1999

§ 102(e) Date: Mar. 4, 1999

(87) PCT Pub. No.: WO99/01509

PCT Pub. Date: Jan. 14, 1999

(30) Foreign Application Priority Data

Jul. 4, 1997 (JP) .................................................... 9-179867

(51) Int. Cl.[7] ................................ C08J 5/10; C08K 3/10; C08L 23/00

(52) U.S. Cl. ........................ 524/437; 524/434; 524/436

(58) Field of Search ............................... 524/437, 438, 524/442, 444, 445, 447, 448, 436, 434; 423/712, 713, 714, 715, 716, 717

(56) References Cited

U.S. PATENT DOCUMENTS

| | | | |
|---|---|---|---|
| 3,650,704 | 3/1972 | Kumura et al. | 23/315 |
| 3,879,525 | 4/1975 | Miyata et al. | 423/277 |
| 4,299,759 | 11/1981 | Miyata et al. | 260/45.7 R |
| 4,347,353 | 8/1982 | Miyata et al. | 528/485 |
| 4,729,854 | 3/1988 | Miyata et al. | 252/609 |
| 5,252,645 * | 10/1993 | Nosu et al. | 524/180 |

FOREIGN PATENT DOCUMENTS

| | | |
|---|---|---|
| 19503522 | 8/1996 | (DE) . |
| 780425 | 6/1997 | (EP) . |
| 0952189 A1 * | 10/1999 | (EP) . |
| 4462280 | 1/1971 | (JP) . |
| 47-32198 | 8/1972 | (JP) . |
| 48-29477 | 9/1973 | (JP) . |
| 50-30039 | 9/1975 | (JP) . |
| 51-29129 | 8/1976 | (JP) . |
| 55-80445 | 6/1980 | (JP) . |
| 58-46146 | 10/1983 | (JP) . |
| 60-1241 | 1/1985 | (JP) . |
| 63-118374 | 5/1988 | (JP) . |
| 64-36654 | 2/1989 | (JP) . |
| 9322237 | 11/1993 | (WO) . |
| 9905219 | 2/1999 | (WO) . |

* cited by examiner

Primary Examiner—James J. Seidleck
Assistant Examiner—U. K. Rajguru

(57) ABSTRACT

A synthetic resin composition having heat deterioration resistance comprising:

(A) 100 parts by weight of a synthetic resin; and
(B) 0.001 to 10 parts by weight of hydrotalcite particles defined by the following (i) to (iv):
  (i) the hydrotalcite particles are represented by the following chemical structure formula (1):

$$\{(Mg)_y(Zn)_z\}_{1-x}(Al)_x(OH)_2(A^{n-})_{x/n} \cdot mH_2O \qquad (1);$$

(ii) the hydrotalcite particles have an average secondary particle diameter of 2 μm or less;
  (iii) the hydrotalcite particles have a specific surface area (measured by a BET method) of 1 to 30 m²/g; and
  (iv) the hydrotalcite particles contain an iron compound and a manganese compound in a total amount of 0.02 wt % or less in terms of metals (Fe+Mn). A molded article formed from the above resin composition of the present invention is excellent in heat deterioration resistance and impact resistance and satisfactory in the dispersibility of hydrotalcite particles.

25 Claims, No Drawings

SYNTHETIC RESIN COMPOSITION HAVING RESISTANCE TO THERMAL DETERIORATION AND MOLDED ARTICLES

TECHNICAL FIELD

The present invention relates to a synthetic resin composition having heat deterioration resistance, which comprises a heat deterioration resisting agent composed of hydrotalcite particles having specific properties in a specific proportion. Specifically, it relates to a heat deterioration resisting agent composed of hydrotalcite particles which rarely deteriorate by heat at the time of heat-molding a synthetic resin and can provide outstanding heat deterioration resistance and excellent physical properties such as high dispersibility, non-cohesiveness, moldability and impact strength to resins; and to a resin composition composed of the same in a specific proportion.

More specifically, the present invention relates to a resin composition and a molded article which contain hydrotalcite particles as a heat deterioration resisting agent, namely, a heat stabilizer, or as an acid-acceptor and which experience an extremely small reduction in physical strength caused by the thermal decomposition of a resin at the time of molding or use.

BACKGROUND ART

Hydrotalcite particles have been developed as a stabilizer to prevent the halogen and/or acidic substance contained in the following substances from causing the corrosion or formation of rust in metal portions of a molding machine or a metal mold at the time of molding or causing, in particular, such a trouble that the obtained resin or a molded article thereof deteriorates by heat or ultraviolet light (for example, U.S. Pat. No. 4,347,353 and JP-B 58-46146). The substances are halogen-containing polyolefins (used as a general term for homopolymers as well as various copolymers in the present invention) derived from a polymerization catalyst and/or post-halogenation such as olefin polymers and copolymers thereof, produced by a Ziegler polymerization catalyst which comprises a halogen-containing compound as a catalyst component and/or carrier component, and chlorinated polyethylene; halogen- and/or acidic substance-containing thermoplastic resins such as AS, ABS, polyacrylates and polymethacrylates produced using a catalyst containing halogen and/or an acidic substance such as sulfuric acid, boron trifluoride, tin tetrachloride or hydrochloric acid; halogen-containing thermoplastic resins such as polymer blends containing vinylidene chloride polymers and copolymers and a vinyl chloride resin; halogen-containing thermoplastic resins such as chlorinated vinyl chloride polymers and copolymers; and thermoplastic resins containing halogen and/or an acidic substance derived from a catalyst and/or monomer and/or post-halogenation such as blend resins containing these.

Although the above hydrotalcite particles have properties suitable for giving a molded article having excellent heat deterioration resistance when contained in a resin, it has been found that the hydrotalcite particles still have problems to be solved along with recent growing requirements for the properties of the particles in spite of the fact that the amount of the hydrotalcite particles to be contained in a resin is very small.

That is, it has been strongly demanded that the hydrotalcite particles have excellent stability against heat and ultraviolet light for resins.

Then, the inventors of the present invention have conducted further studies to meet this demand and have found that the amounts of specific metal compounds as impurities contained in the hydrotalcite particles and the shape of the particle have influence upon heat deterioration and physical properties and that an excellent heat deterioration resisting agent can be obtained by limiting these to specific values.

Although the hydrotalcite particles as a resin additive are produced in large quantities on an industrial scale, various impurities derived mainly from their source materials are contained in the hydrotalcite particles in the production process of the hydrotalcite particles as a solid solution or impurity.

That is, the hydrotalcite particles are industrially produced from a magnesium source material, aluminum source material and alkali source material as main source materials, and these source materials mostly rely on natural resources or processed products thereof. Therefore, these source materials contain many kinds of metal compounds and non-metal compounds and are refined for use in limits that costs permit. It is, however, impossible to avoid the inclusion of many kinds of impurities.

In the production process of the hydrotalcite particles, the elution and inclusion of metals derived from the materials of various apparatuses such as a reactor, container, transport pipes, crystallizer or grinder cannot be avoided completely.

The present inventors have identified components which have an influence upon heat deterioration and reductions in properties at the time of molding a resin or upon the heat deterioration of a molded article, out of many kinds of impurities which are contained in hydrotalcite and derived from its source materials and included during its production process, and have conducted studies on the components and the amounts thereof. They have found that when an iron compound and a manganese compound out of various impurities are contained even in trace amounts as an impurity or a solid solution, they have influence upon the heat deterioration of a resin.

It has also been found with regard to the hydrotalcite particles of the present invention that the total content of these specific impurities is limited to values smaller than predetermined values in order for these specific impurities to exert a marked function on heat deterioration and that the particle diameter and specific surface area of the hydrotalcite particle also have influence upon heat deterioration. Therefore, it has been revealed that, to obtain a composition which rarely deteriorates by heat when contained in a resin, (i) the amounts of specific metal compounds contained in the hydrotalcite particles should be smaller than or equal to predetermined values, (ii) the average secondary particle diameter of the hydrotalcite particles should be smaller than or equal to a predetermined value (that is, the particles rarely agglomerate), and (iii) the hydrotalcite particles should have a predetermined specific surface area (or a good crystal form).

DISCLOSURE OF THE INVENTION

According to the present invention, there is provided a synthetic resin composition having heat deterioration resistance comprising:
(A) 100 parts by weight of a synthetic resin; and
(B) 0.001 to 10 parts by weight of hydrotalcite particles defined by the following (i) to (iv):
(i) the hydrotalcite particles are represented by the following chemical structure formula (1):

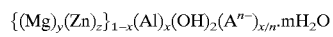  (1)

wherein $A^{n-}$ is at least one anion having a valence of n, and x, y, z and m are values which satisfy the following expressions:

$$0.1 \leq x \leq 0.5,\ y+z=1,\ 0.5 \leq y \leq 1\ 0 \leq z \leq 0.5,\ 0 \leq m < 1;$$

(ii) the hydrotalcite particles have an average secondary particle diameter measured by a laser diffraction scattering method of 2 μm or less;
(iii) the hydrotalcite particles have a specific surface area measured by a BET method of 1 to 30 m²/g; and
(iv) the hydrotalcite particles contain an iron compound and a manganese compound in a total amount of 0.02 wt % or less in terms of metals (Fe+Mn).

The present invention will be described in more detail hereunder.

The hydrotalcite particles of the present invention are represented by the following chemical structure formula (1).

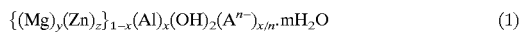

$$\{(Mg)_y(Zn)_z\}_{1-x}(Al)_x(OH)_2(A^{n-})_{x/n} \cdot mH_2O \qquad (1)$$

In the above general formula (1), $A^{n-}$ is at least one anion having a valence of n, as exemplified by $ClO_4^-$, $SO_4^{2-}$ and $CO_3^{2-}$. Of these, $CO_3^{2-}$ is preferred.

In the above general formula (1), (y+z) is equal to 1, and x is a value which satisfies $0.1 \leq x \leq 0.5$, preferably $0.2 \leq x \leq 0.4$.

Further, y is a value which satisfies $0.5 \leq y \leq 1$, preferably $0.7 \leq y \leq 1$. Further, z is a value which satisfies $0 \leq z \leq 0.5$, preferably $0 \leq z \leq 0.3$. M is a value which satisfies $0 \leq m < 1$, preferably $0 \leq m \leq 0.7$.

The hydrotalcite particles used in the present invention have an average secondary particle diameter measured by the laser diffraction scattering method of 2 μm or less. That is, most of the particles must be primary particles and not agglomerates of primary particles to achieve the object. The hydrotalcite particles preferably have an average secondary particle diameter of 0.4 to 1.0 μm.

Further, each of the hydrotalcite particles has a specific surface area measured by the BET method of 1 to 30 m²/g, preferably 5 to 20 m²/g. In addition, the hydrotalcite particle preferably has a ratio of a specific surface area measured by the BET method to a specific surface area measured by a Blaine method of 1 to 6. The particle having the ratio of 1 to 3 is more preferred because the dispersibility in a resin of the particles is excellent.

Further, the hydrotalcite particles of the present invention contain an iron compound and a manganese compound as impurities in a total amount of 0.02 wt % or less, preferably 0.01 wt % or less, in terms of metals (Fe+Mn).

The total content of an iron compound and a manganese compound as impurities contained in the hydrotalcite particles of the present invention is within the above range in terms of metals (Fe+Mn) as described above. Preferably, the total content of heavy metal compounds including a cobalt compound, chromium compound, copper compound, vanadium compound and nickel compound in addition to an iron compound and a manganese compound is within the above range in terms of metals. That is, it is more advantageous that the hydrotalcite particles should have a total content of (Fe+Mn+Co+Cr+Cu+V+Ni) of 0.02 wt % or less, preferably 0.01 wt % or less, in terms of metals.

As the total content of an iron compound and a manganese compound contained in the hydrotalcite particles increases, these compounds further reduce the thermal stability of the blended resin. However, in order for the resin to have an excellent thermal stability and not to have its physical properties reduced, it is not enough that the total amount of the iron compound and the manganese compound satisfies the above range. The average secondary particle diameter and specific surface area values of the hydrotalcite particles must also satisfy the above ranges. As the average secondary particle diameter of the hydrotalcite particles becomes larger than the above value, there arise such problems as the liberation of the hydrotalcite particles into a resin due to insufficient dispersibility, deterioration in neutralizability with halogen, low thermal stability, a reduction in mechanical strength and poor outer appearance. Further, when each of the hydrotalcite particles has a specific surface area measured by the BET method of more than 30 m²/g, the dispersibility in the resin of the hydrotalcite particles lowers and the thermal stability thereof also deteriorates.

As described above, when the hydrotalcite particles are represented by (i) the above chemical structure formula (1) and have (ii) an average secondary particle diameter, (iii) a specific surface area and (iv) a total content of an iron compound and a manganese compound (or a total content of these and other metal compounds) within the above respective ranges, a high-performance resin composition which satisfies requirements for compatibility with a resin, dispersibility, non-cohesiveness, moldability and processability, outer appearance of a molded article, mechanical strength, heat deterioration resistance and the like is obtained.

The method and conditions for producing the hydrotalcite particles of the present invention are not limited as long as hydrotalcite particles which satisfy the above requirements (i) to (iv) are obtained. Raw materials and production conditions for obtaining the hydrotalcite particles are known per se and, basically, the hydrotalcite particles can be produced in accordance with known methods (for example JP-B 46-2280 and its corresponding U.S. Pat. No. 3,650,704; JP-B 47-32198 and its corresponding U.S. Pat. No. 3,879,525; JP-B 50-30039; JP-B 48-29477 and JP-B 51-29129).

Typical examples of the raw materials used to produce the hydrotalcite particles in large quantities on an industrial scale include aluminum sulfate and aluminum hydroxide as an aluminum source material, magnesium chloride (such as brine or ion bittern) as a magnesium source material and limestone (or a slaked product thereof) as an alkali source material. Most of them are natural resources or processed products thereof.

Most of these industrial raw materials of the hydrotalcite particles contain impurity metal compounds such as an iron compound and a manganese compound in no small quantities as will be described hereinafter. The hydrotalcite particles obtained from these raw materials contain these impurity metal compounds as a solid solution or impurity, and these impurity metal compounds cannot be removed with simple means.

Even if raw materials containing impurity metal compounds in small quantities (these are generally expensive) are used, when the hydrotalcite particles are produced in large quantities on an industrial scale, it is impossible to avoid the inclusion of components derived from the materials of apparatuses such as a reactor, storage tank, transport pipes, crystallizer, grinder and drier. Since the production process of the hydrotalcite particles includes the step of reacting under an alkali condition and the step of aging by heating over a long period of time, the inclusion of impurity metal compounds such as an iron compound cannot be avoided without paying special attention to the materials of the apparatuses.

To this end, special attention must be paid in the present invention to obtaining hydrotalcite particles having extremely small contents of an iron compound and a manganese compound. That is, it is necessary (i) to remove impurity metal compounds such as an iron compound and a manganese compound from raw materials or to select and use raw materials which have small contents of these impurity metal compounds and (ii) to use apparatuses made from materials from which impurity metal compounds rarely elute in the production process of hydrotalcite particles.

U.S. Pat. No. 3,650,704 discloses hydrotalcite particles having a heavy metal impurity content of 30 ppm or less. The special hydrotalcite particles are synthesized hydrotalcite particles for use as a gastric antacid which are highly purified to be administered to human bodies and have a high antacidic effect. This patent teaches that the inclusion of impurities harmful to human bodies can be prevented by carefully selecting the class of the raw material (line 31 on page 2 to line 24 on page 3) but fails to give a detailed description of the class of the raw material. This patent merely specifies the content of heavy metal impurities in the hydrotalcite particles as a medicine. The hydrotalcite particles are obtained from special raw materials using special small-sized apparatuses (such as a glass vessel and an apparatus for glass lining).

The hydrotalcite particles of the present invention are obtained by removing impurity metal compounds such as an iron compound and a manganese compound from raw materials or selecting and using raw materials having small contents of these impurity metal compounds. To produce the hydrotalcite particles, apparatuses should be selected that are made from alkali-resistant and acid-resistant materials from which an iron compound and a manganese compound, especially an iron compound, rarely elute.

The hydrotalcite particles of the present invention are a resin additive which is used in large quantities in industrial fields and must be inexpensive. Therefore, it is not advisable to purify all of the aluminum source material, magnesium source material and alkali source material excessively for use because this boosts costs.

Thus, by preparing the hydrotalcite particles of the present invention which mainly do not contain an iron compound and a manganese compound and which have a predetermined average particle diameter and a predetermined specific surface area, a resin composition can be provided that satisfies requirements for improving the quality of the resin, that is, for maintaining high heat deterioration resistance and high impact strength thereof.

Stated more specifically, for the production of the hydrotalcite particles of the present invention, sea water, natural brine or ion bittern can be used as a magnesium source material after an iron compound and a manganese compound are removed therefrom by means of purification, and aluminum sulfate or aluminum chloride for industrial use can be used as an aluminum source material.

Further, caustic soda for industrial use is suitable for use as an alkali source material, and limestone is not quite preferred because it is difficult to purify it. Soda carbonate or carbonic acid gas for industrial use can be used as a source material for carbonic acid ions. The composition of each of the source materials, especially the content of an iron compound and the content of a manganese compound will be described in detail in Reference Examples hereinafter. The material of each apparatus will also be described in detail in the Reference Examples.

The hydrotalcite particles used in the present invention can be blended with a synthetic resin directly or after each of the particles is treated with a surface treatment agent. The latter is generally preferred.

The surface treatment agent is at least one selected from the group consisting of higher fatty acids, anionic surfactants, phosphates, coupling agents (silane-, titanate- and aluminum-based), and esters of polyhydric alcohols and fatty acids.

Preferred examples of the surface treatment agent include higher fatty acids having 10 or more carbon atoms such as stearic acid, erucic acid, palmitic acid, lauric acid and behenic acid; alkali metal salts of the higher fatty acids; sulfuric ester salts of higher alcohols such as stearyl alcohol and oleyl alcohol; anionic surfactants such as sulfuric ester salts of polyethylene glycol ethers, amide-bonded sulfuric ester salts, ester-bonded sulfuric ester salts, ester-bonded sulfonates, amide-bonded sulfonates, ether-bonded sulfonates, ether-bonded alkyl aryl sulfonates, ester-bonded alkyl aryl sulfonates and amide-bonded alkyl aryl sulfonates; phosphates such as acid and alkali metal salts and amine salts of orthophosphoric acid and mono- or di-esters such as oleyl alcohol and stearyl alcohol or mixtures thereof; silane coupling agents such as vinylethoxysilane, vinyl-tris (2-methoxy-ethoxy)silane, γ-methacryloxypropyl trimethoxysilane, γ-aminopropyl trimethoxysilane, β-(3,4-epoxycyclohexyl)ethyl trimethoxysilane, γ-glycidoxypropyl trimethoxysilane and γ-mercaptopropyl trimethoxysilane; titanate-based coupling agents such as isopropyltriisostearoyl titanate, isopropyltris(dioctylpyrophosphate)titanate, isopropyltri(N-aminoethyl-aminoethyl)titanate and isopropyltridecylbenzenesulfonyl titanate; aluminum-based coupling agents such as acetoalkoxyaluminium diisopropylate; and esters of polyhydric alcohols and fatty acids such as glycerin monostearate and glycerin monooleate.

The surface of each hydrotalcite particle can be coated using the above surface treatment agents in accordance with a wet or dry process known per se. For instance, the wet process comprises adding a liquid or emulsion surface treatment agent to a slurry of hydrotalcite particles and thoroughly mixing these mechanically at a temperature up to about 100° C. The dry process comprises adding a liquid, emulsion or solid surface treatment agent to hydrotalcite particles while the particles are stirred thoroughly with a mixer such as a Henschel mixer and thoroughly mixing these with or without application of heat. The amount of the surface treatment agent added can be suitably selected but is preferably about 10 wt % or less based on the weight of the hydrotalcite particles.

The surface-treated hydrotalcite particles may be subjected to means which are suitably selected such as washing with water, dehydration, granulation, drying, grinding or classification as required to prepare an end product thereof. The hydrotalcite particles of the present invention are blended with a resin in an amount of 0.001 to 10 parts by weight, preferably 0.01 to 5 parts by weight, based on 100 parts by weight of the resin.

The synthetic resin to be blended with the hydrotalcite particles of the present invention is generally a thermoplastic synthetic resin which is generally used as a molded article, as exemplified by polymers and copolymers of olefins having 2 to 8 carbon atoms (α-olefins) such as polyethylene, polypropylene, ethylene/propylene copolymer, polybutene and poly.4-methylpentene-1, copolymers of these olefins with dienes, ethylene-acrylate copolymer, polystyrene, ABS resin, AAS resin, AS resin, MBS resin, ethylene-vinyl chloride copolymer resin, ethylene-vinyl acetate copolymer resin, ethylene-vinyl chloride-vinyl acetate graft polymer resin, vinylidene chloride, polyvinyl chloride, chlorinated polyethylene, chlorinated polypropylene, vinyl chloride-propylene copolymer, vinyl acetate resin, phenoxy resin, polyacetals, polyamides, polyimides, polycarbonates, polysulfones, polyphenylene oxide, polyphenylene sulfide, polyethylene terephthalate, polybutylene terephthalate and methacrylic resins.

Of these thermoplastic resins, preferred are those provided with an excellent heat deterioration prevention effect and mechanical strength retaining characteristics by the hydrotalcite particles such as polyolefins, copolymers thereof and halogen-containing resins thereof, as exemplified by polypropylene-based resins such as polypropylene homopolymer and ethylene-propylene copolymer; polyethylene-based resins such as high-density polyethylene, low-density polyethylene, straight chain low-density polyethylene, ultra low-density polyethylene, EVA (ethylene vinyl acetate resin), EEA (ethylene ethyl acrylate resin), EMA (ethylene-methyl acrylate copolymer resin), EAA (ethylene-acrylic acid copolymer resin) and ultra high molecular weight polyethylene; and polymers and copolymers of olefins having 2 to 6 carbon atoms (α-ethylene) such as polybutene and poly(4-methylpentene-1). Of these, polyethylene, polypropylene, polybutene, poly(4-methylpentene-1) and their copolymers are particularly suitable for use in the composition of the present invention. Although these polyolefins contain halogen derived from a polymerization catalyst, the composition of the present invention is extremely effective in suppressing the heat deterioration caused by the halogen. The composition of the present invention is also advantageous in supressing heat deterioration for vinyl chloride and a copolymer thereof.

Further, thermosetting resins such as epoxy resins, phenolic resins, melamine resins, unsaturated polyester resins, alkyd resins and urea resins and synthetic rubber such as EPDM, butyl rubber, isoprene rubber, SBR, NBR and chlorosulfonated polyethylene may also be used as the synthetic resin.

To prepare the composition of the present invention, means of blending the hydrotalcite particles with the resin is not particularly limited. For example, the hydrotalcite particles may be blended with the synthetic resin together with, or separately from, other resin compounding ingredients as uniformly as possible by the same means as commonly used known means of blending a stabilizer or filler with these resins. For example, the means may be known mixing means such as a ribbon blender, high-speed mixer, kneader, pelletizer or extruder for blending these components, or means comprising adding a suspension of a heat deterioration resisting agent comprising hydrotalcite particles as an effective ingredient to a post-polymerization slurry and stirring and drying the mixture.

The resin composition having heat deterioration resistance of the present invention may contain other commonly used additives in addition to the above components. The additives include an antioxidant, ultraviolet screening agent, antistatic agent, pigment, foaming agent, plasticizer, filler, reinforcement, organic halogen flame retardant, crosslinking agent, optical stabilizer, ultraviolet absorber, lubricant, other inorganic and organic heat stabilizers and the like.

The present invention will be explained in more detail with reference to the following examples. The proportion of each additive contained in the resin composition is expressed in parts by weight based on 100 parts by weight of the resin.

In the following examples, (1) the average secondary particle diameter, (2) the specific surface area measured by the BET method, (3) the specific surface area measured by the Blaine method and (4) the metal analysis of the hydrotalcite particles and (5) the Izod impact strength of the molded article of the resin composition were measured in accordance with the following measuring methods.

(1) Average secondary particle diameter of hydrotalcite secondary particles

This is measured and determined using the MICROTRAC particle size analyzer of LEEDS & NORTHRUP INSTRUMENTS CO., LTD.

Sample powder is added in an amount of 700 mg to 70 ml of a 0.2 wt % aqueous solution of sodium hexametaphosphate and dispersed with ultrasonic waves (Model US-300 of NISSEI PLASTIC INDUSTRIAL CO., LTD., electric current: 300 $\mu$A) for 3 minutes. The resulting dispersion is collected in an amount of 2 to 4 ml and added to the sample chamber of the above particle size analyzer containing 250 ml of deaerated water. The analyzer is then activated to circulate the suspension for 3 minutes and a particle size distribution is measured. The particle size distribution is measured twice in total and the arithmetic mean value of the 50% cumulative secondary particle diameters obtained by the above measurements is calculated and taken as the average secondary particle diameter of the sample.

(2) Specific surface area measured by BET method of hydrotalcite particles

This is measured in accordance with the specifications of JIS Z8830.

(3) Specific surface area measured by Blaine method of hydrotalcite particles

This is measured in accordance with the Blaine specific surface area measurement of JIS R5201.

(4) Metal analysis of hydrotalcite particles

This is measured by ICP-MS (Inductively Coupled Plasma-Mass Spectrometry).

(5) Izod impact strength

This is measured in accordance with JIS K7110.

Reference Examples 1 to 7 (preparation of hydrotalcite particles)

The kind and property of each raw material used for the preparation of hydrotalcite particles in Reference Examples 1 to 7 are shown below.

|  | Raw material No.1: unpurified brine | Raw material No. 2: purified brine | Raw material No. 3: ion bittern | Raw material No. 4: aluminum sulfate | Raw material No. 5: zinc chloride |
|---|---|---|---|---|---|
| $MgCl_2$ g/L | 314.6 | 312.1 | 168.2 | | |
| $CaCl_2$ g/L | | | 68.3 | | |
| $ZnCl_2$ g/L | | | | | 572.7 |
| $Al_2O_3$ g/L | | | | 106.8 | |
| Fe mg/L | 89.2 | ≦1 | ≦1 | 10 | ≦1 |

-continued

|  | | | | | |
|---|---|---|---|---|---|
| Mn mg/L | 3.5 | ≦1 | ≦1 | ≦0.5 | 13.9 |

|  | Raw material No. 6: aqueous solution of caustic soda | Raw material No. 7: sodium carbonate | Raw material No. 8: slaked product of limestone | Raw material water water | Raw material No. 10: sodium stearate |
|---|---|---|---|---|---|
| NaOH % | 48.7 | | | | |
| $Na_2CO_3$ % | | 99.9 | | | |
| $Ca(OH)_2$ % | | | 96.1 | | |
| $C_{17}H_{36}COONa$ % | | | | | 93.4 |
| Fe % | 0.001 | 0.002 | 0.07 | ≦0.0001 | 0.0003 |
| Mn % | ≦0.0001 | ≦0.0001 | 0.003 | ≦0.0001 | ≦0.0001 |

|  | Raw material No. 11; aluminum hydroxide |
|---|---|
| $Al(OH)_3$ % | 99.7 |
| Fe % | 0.0035 |
| Mn % | 0.0001 |

REFERENCE EXAMPLE 1

Purified brine (raw material No. 2) was transferred to a concentration control tank, and aluminum sulfate (raw material No. 4) was added to the purified brine to prepare a mixed aqueous solution (A) having an Mg concentration of 1.95 mol/l and an Al concentration of 0.847 mol/l. Thereafter, caustic soda (raw material No. 6) was transferred to another concentration control tank, and sodium carbonate powder (raw material No. 7) and water (raw material No. 9) were added to prepare an aqueous solution (B) having an NaOH concentration of 3 mol/l and an $Na_2CO_3$ concentration of 0.23 mol/l.

There were injected 1.18 liters of the mixed aqueous solution (A) and 2.2 liters of the aqueous solution (B) into a water-containing reactor at the same time under agitation to ensure that the residence time was 60 minutes, and a reaction slurry of hydrotalcite (H.T.) was obtained. This reaction slurry was collected in an amount of 800 liters and aged by heating in an autoclave at 170° C. for 6 hours under agitation. After cooled, the resulting slurry was transferred to a surface treatment tank and heated to 80° C. under agitation, 2 kg of sodium stearate (raw material No. 10) dissolved in 50 liters of hot water heated at 80° C. was injected into the tank little by little, and the resulting mixture was stirred for 30 minutes to complete a surface treatment. A solid material was separated by filtration, washed, dried with a hot air drier and ground with a hammer mill to prepare a sample.

The obtained hydrotalcite was analyzed, and, the composition thereof was found to be $Mg_{0.7}Al_{0.3}(OH)_2(CO_3)_{0.15} \cdot 0.5H_2O$.

The total content of Fe and Mn in the hydrotalcite was 0.002 wt % in terms of metals and the specific surface area measured by the BET method of the hydrotalcite was 10.4 $m^2/g$.

Apparatuses used were made from the following materials.
1. raw material tank (for brine): SUS 304 lined with FRP
2. raw material tank (for aluminum sulfate): SUS 304 lined with FRP
3. concentration control tank (for brine+aluminum sulfate): SUS 304 lined with FRP
4. raw material tank (for caustic soda): SUS 304
5. concentration control tank (for caustic soda+sodium carbonate): SUS 304
6. transport pipe (for brine and mixed solution): PVC pipe
7. transport pipe (for caustic soda and mixed solution): SUS 304
8. transport pipe (for hydrothermally treated material): SUS 316L
9. reactor and autoclave: SUS 304 lined with Hastelloy C276
10. stirrer: SUS 316L
11. filter, drier and mill: SUS 304

Purification method for natural underground brine

The above purified brine (raw material No. 2) was obtained by purifying natural brine (raw material No. 1) in accordance with the following method.

Iron and manganese contained in brine collected from the underground are present in the forms of divalent ions, trivalent ions, colloidal iron or the like, respectively. To remove the iron and the manganese, the brine was oxidized by aeration and then with chlorine. The obtained oxide was condensed and then separated by filtration to obtain purified brine (raw material No. 2).

REFERENCE EXAMPLE 2

A reaction slurry of hydrotalcite was obtained using the same raw materials in the same concentrations and the same apparatuses as in Reference Example 1 except that unpurified brine (raw material No. 1) was used in place of purified brine.

This slurry was collected in an amount of 800 liters, aged by heating, surface-treated with sodium stearate and subjected to the same process as in Reference Example 1 to prepare a sample.

The obtained hydrotalcite was analyzed, and, the composition thereof was found to be $Mg_{0.7}Al_{0.3}(OH)_2(CO_3)_{0.15} \cdot 0.5H_2O$.

The total content of Fe and Mn in the hydrotalcite was 0.028 wt % and the specific surface area measured by the BET method of the hydrotalcite was 11 $m^2/g$.

REFERENCE EXAMPLE 3

A product was obtained in the same manner as in Reference Example 1 except that the reactor, autoclave and surface treatment tank used were made of a carbon steel plate for medium and normal pressure vessels (SGP material, JIS G3118-1977) and all the transport pipes were carbon steel pipes for plumbing (SGP material, JIS G3452-1984).

The obtained hydrotalcite was analyzed, and, the composition thereof was found to be $Mg_{0.7}Al_{0.3}(OH)_2(CO_3)_{0.15} \cdot 0.55H_2O$.

The total content of Fe and Mn in the hydrotalcite was 0.038 wt % and the specific surface area measured by the BET method of the hydrotalcite was 11 $m^2/g$.

REFERENCE EXAMPLE 4

A reaction was caused in the same manner as in Reference Example 1 using the same apparatuses as in Reference Example 1 except that ion bittern and zinc chloride were used in place of the purified brine out of the raw materials. That is, ion bittern (raw material No. 3) was transferred to a concentration control tank, and zinc chloride (raw material No. 5) and aluminum sulfate (raw material No. 4) were added to prepare a mixed aqueous solution having an Mg concentration of 1.05 mol/l, a Zn concentration of 0.42 mol/l and an Al concentration of 0.63 mol/l. At this point, calcium sulfate precipitated in the mixing tank was separated by filtration to obtain a filtrate (A). Thereafter, caustic soda (raw material No. 6) was transferred to another concentration control tank, and sodium carbonate powder (raw material No. 7) and water (raw material No. 9) were added to prepare an aqueous solution (B) having an NaOH concentration of 3 mol/l and an $Na_2CO_3$ concentration of 0.225 mol/l.

There were injected 1 liter of the solution (A) and 1.4 liters of the solution (B) into a reactor containing water at the same time under agitation to ensure that the residence time was 60 minutes, and a reaction slurry of hydrotalcite (H.T.) was obtained.

This reaction slurry was collected in an amount of 800 liters and aged by heating in an autoclave at 140° C. for 6 hours under agitation. After cooled, the resulting slurry was transferred to a surface treatment tank and heated to 80° C. under agitation, 1.3 kg of sodium stearate (raw material No. 10) dissolved in 50 liters of hot water heated at 80° C. was injected into the tank little by little, and the resulting mixture was stirred for 30 minutes to complete a surface treatment. A solid material was separated by filtration, washed, re-emulsified and spray-dried to prepare a sample.

The obtained hydrotalcite was analyzed, and, the composition thereof was found to be $Mg_{0.5}Zn_{0.2}Al_{0.3}(OH)_2(CO_3)_{0.15} \cdot 0.55H_2O$.

The total content of Fe and Mn in the hydrotalcite was 0.008 wt % and the specific surface area measured by the BET method of the hydrotalcite was 7.1 $m^2/g$.

REFERENCE EXAMPLE 5

Slaked lime (raw material No. 8) obtained from limestone was transferred to a concentration control tank to obtain a slurry having a $Ca(OH)_2$ concentration of 200 g/l. Meanwhile, purified brine (raw material No. 2) was transferred to another concentration control tank and water (raw material No. 9) was added to prepare an aqueous solution having an Mg concentration of 2 mol/l. The aqueous solution was transferred to a reactor and 0.726 liter of the $Ca(OH)_2$ aqueous solution was added to 1 liter of the Mg aqueous solution little by little under agitation. After the obtained slurry of magnesium hydroxide was dehydrated with a filter and washed with water, water was added to re-emulsify the slurry and a slurry having a magnesium hydroxide concentration of 50 g/l was obtained. Thereafter, there were added 35.1 liters of zinc chloride (raw material No. 5) and 70.9 liters of aluminum sulfate (raw material No. 4) to 229.4 liters of the above magnesium hydroxide slurry under agitation, and 327.9 liters of caustic soda containing 7.83 kg of sodium carbonate and having a concentration of 3 mol/l was then injected little by little to obtain a mixed slurry. To this slurry was added water to prepare 800 liters of the aqueous solution, which was then aged by heating in an autoclave at 150° C. for 6 hours under agitation to obtain a hydrotalcite slurry. After cooled, the resulting slurry was transferred to a surface treatment tank and heated to 80° C. under agitation, and 0.75 kg of sodium stearate (raw material No. 10) dissolved in 50 liters of hot water heated at 80° C. was injected into the tank little by little, and the resulting mixture was stirred for 30 minutes to complete a surface treatment. A solid material was separated by filtration, washed, dried with hot air and ground to prepare a sample.

The reactor, autoclave and surface treatment tank used were made of a carbon steel plate for medium and normal pressure containers (SGP material, JIS G3118-1977) and all the transport pipes were carbon steel pipes for plumbing (SGP material, JIS G3452-1984).

The obtained hydrotalcite was analyzed, and was, the composition thereof was found to be $Mg_{0.4}Zn_{0.3}Al_{0.3}(OH)_2(CO_3)_{0.15} \cdot 0.55H_2O$.

The total content of Fe and Mn in the hydrotalcite was 0.058 wt % and the specific surface area measured by the BET method of the hydrotalcite was 16 $m^2/g$.

REFERENCE EXAMPLE 6

Slaked lime (raw material No. 8) obtained from limestone was transferred to a concentration control tank to obtain a slurry having a $Ca(OH)_2$ concentration of 200 g/l. Meanwhile, purified brine (raw material No. 2) was transferred to another concentration control tank and water (raw material No. 9) was added to prepare an aqueous solution having an Mg concentration of 2 mol/l. The aqueous solution was transferred to a reactor and 0.726 liter of the $Ca(OH)_2$ aqueous solution was added to 1 liter of the Mg aqueous solution little by little under agitation. After the obtained slurry of magnesium hydroxide was dehydrated with a filter and washed with water, water was added to re-emulsify the slurry and a slurry having a magnesium hydroxide concentration of 100 g/l was obtained. Thereafter, there were 17.01 kg of aluminum hydroxide (raw material No. 11), 11.54 kg of sodium carbonate (raw material No. 7) dissolved in water and water (raw material No. 9) were added to 295.7 liters of the above magnesium hydroxide slurry under agitation to prepare 800 liters of a mixed slurry.

This mixed slurry was then aged by heating in an autoclave at 180° C. for 20 hours under agitation to obtain a hydrotalcite slurry. After cooled, the resulting slurry was transferred to a surface treatment tank to be subjected to an agitation treatment using 1.7 kg of sodium stearate in the same manner as in Reference Example 1. The same apparatuses as those used in Reference Example 1 were used.

The obtained hydrotalcite was analyzed, and, the composition thereof was found to be $Mg_{0.7}Al_{0.3}(OH)_2(CO_3)_{0.15} \cdot 0.55H_2O$.

The total content of Fe and Mn in the hydrotalcite was 0.048 wt % and the specific surface area measured by the BET method of the hydrotalcite was 7 m$^2$/g. However, the hydrotalcite particles agglomerated.

REFERENCE EXAMPLE 7

Purified brine (raw material No. 2) was transferred to a concentration control tank, and aluminum sulfate (raw material No. 4) was added to prepare a mixed aqueous solution (A) having a Mg concentration of 1.95 mol/l and an Al concentration of 0.847 mol/l. Thereafter, caustic soda (raw material No. 6) was transferred to another concentration control tank, and sodium carbonate powder (raw material No. 7) and water were added to prepare an aqueous solution (B) having an NaOH concentration of 3 mol/l and an Na$_2$CO$_3$ concentration of 0.23 mol/l.

There were injected 1.18 liters of the mixed aqueous solution (A) and 2.2 liters of the aqueous solution (B) into a water-containing reactor at the same time under agitation to ensure that the residence time was 60 minutes, and a reaction slurry of hydrotalcite was obtained. This reaction slurry was transferred in an amount of 800 liters to a surface treatment tank and heated to 80° C. under agitation, 2 kg of sodium stearate (raw material No. 10) dissolved in 50 liters of hot water heated at 80° C. was injected into the tank little by little, and the resulting mixture was stirred for 30 minutes to complete a surface treatment. A solid material was separated by filtration, washed, dried with hot air and ground to prepare a sample.

The obtained hydrotalcite was analyzed, and, the composition thereof was found to be Mg$_{0.7}$Al$_{0.3}$(OH)$_2$(CO$_3$)$_{0.15}$·0.55H$_2$O.

The total content of Fe and Mn in the hydrotalcite was 0.004 wt % and the specific surface area measured by the BET method of the hydrotalcite was 60 m$^2$/g.

The same apparatuses as those used in Reference Example 1 were used.

The properties and metal contents of the hydrotalcite particles obtained in the above Reference Examples 1 to 7 are shown in the following table.

| Reference Example | 1 | 2 | 3 | 4 | 5 | 6 | 7 |
|---|---|---|---|---|---|---|---|
| Fe wt % | 0.0019 | 0.0265 | 0.0376 | 0.0072 | 0.0551 | 0.0490 | 0.0025 |
| Mn wt % | 0.0004 | 0.0010 | 0.0007 | 0.0004 | 0.0030 | 0.0021 | 0.0004 |
| Cu wt % | ≦0.0001 | ≦0.0001 | ≦0.0001 | ≦0.0001 | ≦0.0001 | 0.0002 | ≦0.0001 |
| Ni wt % | ≦0.0003 | ≦0.0003 | ≦0.0003 | ≦0.0003 | ≦0.0003 | ≦0.0003 | ≦0.0003 |
| Co wt % | ≦0.0004 | ≦0.0004 | ≦0.0004 | ≦0.0004 | ≦0.0004 | ≦0.0004 | ≦0.0004 |
| V wt % | ≦0.0002 | ≦0.0002 | ≦0.0002 | ≦0.0002 | ≦0.0002 | ≦0.0002 | ≦0.0002 |
| Cr wt % | ≦0.0003 | ≦0.0003 | ≦0.0003 | ≦0.0003 | ≦0.0003 | ≦0.0003 | ≦0.0003 |
| Specific surface area measured by BET method m$^2$/g | 10.4 | 10.7 | 11.3 | 7.1 | 16.0 | 7.4 | 60.0 |
| Average secondary particle diameter μm | 0.4 | 0.6 | 0.8 | 0.5 | 1.8 | 1.2 | 4.7 |
| Ratio of BET method/Blaine method | 1.95 | 1.96 | 2.18 | 1.75 | 2.54 | 2.21 | 16.2 |

REFERENCE EXAMPLES 8 AND 9

The compositions and properties of hydrotalcite particles prepared by another method are shown in the following table.

| | Structural formula | Total content of (Fe + Mn) (wt %) | Average secondary particle diameter (μm) | Specific surface area measured by BET method (m$^2$/g) | BET method/Blaine method (Ratio of specific surface area) |
|---|---|---|---|---|---|
| Reference Example 8 | Mg$_{0.66}$Al$_{0.34}$(OH)$_2$(CO$_3$)$_{0.17}$·0.49H$_2$O | 0.075 | 3.0 | 3 | 7.52 |
| Reference Example 9 | Mg$_{0.7}$Al$_{0.3}$(OH)$_2$(CO$_3$)$_{0.15}$·0.5H$_2$O | 0.002 | 1.5 | 28 | 4.30 |

EXAMPLES 1 AND 2 AND COMPARATIVE EXAMPLES 1 TO 8

Pellets having the following composition were prepared by a kneading extruder at 260° C. from the hydrotalcite particles obtained in the above Reference Examples to obtain test samples. The heat deterioration resistance and impact resistance (notched Izod) of each test sample and the dispersibility of the particles were measured in accordance with the following methods.

Heat deterioration resistance: After each of the above pellets was kneaded in the same manner and extruded five times, the melt flow rate of the resulting extruded product was measured in accordance with JIS K7210 and compared with the first measurement data. (The higher the MFR the more deterioration has proceeded.)

Impact resistance: A JIS K7110 Izod test piece was prepared from the pellet extruded five times from an injection molding machine at 230° C. to measure impact resistance.

Dispersibility: A 60 $\mu$m-thick film was formed from the above pellet by a T-die film forming machine and observed visually to evaluate the dispersibility of the hydrotalcite particles based on three criteria. The results are shown in the following table.

Composition ethylene-propylene copolymer 100 PHR

Irganox 1076 0.05 PHR

Irgafos 168 0.05 PHR hydrotalcite particles 0.1 PHR or 0 PHR

| Number | Hydrotalcite particles used (Reference Example No.) | Heat deterioration resistance | | Impact resistance (notched Izod) kg-cm/cm | Dispersibility | Overall evaluation |
|---|---|---|---|---|---|---|
| | | MFR after first extrusion g/10 min | MFR after fifth extrusion g/10 min | | | |
| Example 1 | 1 | 4.5 | 6.0 | 7.0 | Good | Good |
| Example 2 | 4 | 4.5 | 5.8 | 7.3 | Good | Good |
| Comparative Example 1 | 2 | 4.5 | 7.2 | 6.3 | Good | Slightly bad |
| Comparative Example 2 | 3 | 4.6 | 7.4 | 6.1 | Good | Slightly bad |
| Comparative Example 3 | 5 | 4.5 | 7.8 | 5.6 | Good | Slightly bad |
| Comparative Example 4 | 6 | 4.6 | 7.6 | 5.8 | Good | Bad |
| Comparative Example 5 | 7 | 4.5 | 7.2 | 6.0 | Bad | Bad |
| Comparative Example 6 | 8 | 4.6 | 8.2 | 4.8 | Bad | Bad |
| Comparative Example 7 | 9 | 4.7 | 6.2 | 6.3 | Bad | Slightly bad |
| Comparative Example 8 | — | 4.9 | 9.2 | 4.8 | — | Bad |

EXAMPLE 3 AND COMPARATIVE EXAMPLE 9

Pellets having the following composition were prepared by a kneading extruder at 260° C. from the hydrotalcite particles obtained in Reference Examples 1 and 3 to obtain test samples. Samples prepared in the same manner as in Example 1 were measured for heat deterioration resistance, impact resistance and dispersibility.

Composition ethylene-propylene copolymer 100 PHR

Irganox 1076 0.05 PHR

Irgafos 168 0.05 PHR hydrotalcite particles 8 PHR

| Number | Hydrotalcite particles used (Reference Example No.) | MFR after first extrusion g/10 min | MFR after fifth extrusion g/10 min | Impact resistance (notched Izod) kg-cm/cm | Dispersibility | Overall evaluation |
|---|---|---|---|---|---|---|
| | | Heat deterioration resistance | | | | |
| Example 3 | 1 | 4.2 | 5.5 | 7.6 | Good | Good |
| Comparative Example 9 | 3 | 4.5 | 8.3 | 5.7 | Good | Good |

EXAMPLE 4 AND COMPARATIVE EXAMPLES 10 AND 11

The following compound was kneaded using a roll at 180° C. for 5 minutes to prepare a 0.7 mm-thick roll sheet. This sheet was cut to a size of 5 cm×8 cm, placed in a gear oven heated at 180° C. and taken out every 10 minutes to measure its thermal stability. The deterioration of the resin was evaluated based on its coloration, the amount of time elapsed before the resin turned predetermined black was measured, and color at the initial stage of thermal stability and dispersibility were evaluated.

Composition polyvinyl chloride (polymerization degree of 700) 100 PHR calcium stearate 0.5 PHR zinc stearate 0.2 PHR dibenzoyl methane 0.1 PHR hydrotalcite particles 1.5 PHR or 0 PHR epoxylated soybean oil 0.5 PHR

| Number | Hydrotalcite particles used (Reference Example No.) | Dispersibility | Color at the initial stage of thermal stability | Blackening time (minutes) |
|---|---|---|---|---|
| Example 4 | 4 | Good | Colorless, transparent | 90 |
| Comparative Example 10 | 5 | Slightly bad | Weak yellow, transparent | 70 |
| Comparative Example 11 | — | — | Weak yellow, transparent | 20 |

What is claimed is:

1. A synthetic resin composition having heat deterioration resistance comprising:

(A) 100 parts by weight of a synthetic resin; and (B) 0.001 to 10 parts by weight of hydrotalcite particles defined by the following (i) to (iv):

(i) the hydrotalcite particles are represented by the following chemical structure formula (1):

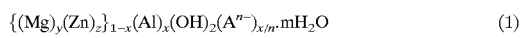

$$\{(Mg)_y(Zn)_z\}_{1-x}(Al)_x(OH)_2(A^{n-})_{x/n} \cdot mH_2O \qquad (1)$$

wherein $A^{n-}$ is at least one anion having a valence of n, n is the valence of A and x, y, z and m are values which satisfy the following expressions:

$$0.1 \leq x \leq 0.5,\ y+z=1,\ 0.5 \leq y \leq 1\ 0 \leq z \leq 0.5,\ 0 \leq m < 1;$$

(ii) the hydrotalcite particles have an average secondary particle diameter measured by a laser diffraction scattering method of 2 μm or less;

(iii) the hydrotalcite particles have a specific surface area measured by a BET method of 1 to 30 m²/g; and (iv) the hydrotalcite particles contain an iron compound and a manganese compound in a total amount of 0.02 wt % or less in terms of metals (Fe+Mn).

2. The synthetic resin composition of claim 1, wherein the hydrotalcite particles are represented by the above chemical structure formula (1) in which x, y and z are values which satisfy the following expressions:

$$0.2 \leq x \leq 0.4,\ y+z=1,\ 0.7 \leq y \leq 1\ 0 \leq z \leq 0.3.$$

3. The synthetic resin composition of claim 1, wherein the hydrotalcite particles have an average secondary particle diameter measured by a laser diffraction scattering method of 0.4 to 1.0 μm.

4. The synthetic resin composition of claim 1, wherein the hydrotalcite particles have a specific surface area measured by a BET method of 5 to 20 m²/g.

5. The synthetic resin composition of claim 1, wherein the hydrotalcite particles have a ratio of a specific surface measured by the BET method to a specific surface area measured by a Blaine method of 1 to 6.

6. The synthetic resin composition of claim 1, wherein the hydrotalcite particles contain an iron compound and a manganese compound in a total amount of 0.01 wt % or less in terms of metals (Fe+Mn).

7. The synthetic resin composition of claim 1, wherein the hydrotalcite particles have a total content of an iron compound, manganese compound, cobalt compound, chromium compound, copper compound, vanadium compound and nickel compound of 0.02 wt % or less in terms of metals.

8. The synthetic resin composition of claim 1, wherein the hydrotalcite particles are dehydrated at a temperature of 150 to 300° C.

9. The synthetic resin composition of claim 1, wherein the hydrotalcite particles are contained in an amount of 0.01 to 5 parts by weight based on 100 parts by weight of the synthetic resin.

10. The synthetic resin composition of claim 1, wherein the synthetic resin is a polyolefin, a copolymer thereof or a halogen-containing resin thereof.

11. The synthetic resin composition of claim 1, wherein the synthetic resin is polyethylene, polypropylene, polybutene, poly(4-methylpentene-1) or their copolymer.

12. The synthetic resin composition of claim 1, wherein the hydrotalcite particles are surface-treated with at least one surface treatment agent selected from the group consisting of higher fatty acids, anionic surfactants, phosphates, coupling agents, and esters of polyhydric alcohols and fatty acids.

13. A molded article formed from the synthetic resin composition of claim 1.

14. A heat deterioration resisting agent composed of hydrotalcite particles defined by the following (i) to (iv):

(i) the hydrotalcite particles are represented by the following chemical structure formula (1):

$$\{(Mg)_y(Zn)_z\}_{1-x}(Al)_x(OH)_2(A^{n-})_{x/n} \cdot mH_2O \quad (1)$$

wherein $A^{n-}$ is at least one anion having a valence of n, and x, y, z and m are values which satisfy the following expressions:

$$0.1 \leq x \leq 0.5, \ y+z=1, \ 0.5 \leq y \leq 1 \ 0 \leq z \leq 0.5, \ 0 \leq m < 1;$$

(ii) the hydrotalcite particles have an average secondary particle diameter measured by a laser diffraction scattering method of 2 μm or less;

(iii) the hydrotalcite particles have a specific surface area measured by a BET method of 1 to 30 m²/g; and (iv) the hydrotalcite particles contain an iron compound and a manganese compound in a total amount of 0.02 wt % or less in terms of metals (Fe+Mn).

15. The heat deterioration resisting agent of claim 14, wherein the hydrotalcite particles are represented by the above chemical structure formula (1) in which x, y and z are values which satisfy the following expressions:

$$0.2 \leq x < 0.4, \ y+z=1, \ 0.7 \leq y \leq 1 \ 0 \leq z \leq 0.3.$$

16. The heat deterioration resisting agent of claim 14, wherein the hydrotalcite particles have an average secondary particle diameter measured by a laser diffraction scattering method of 0.4 to 1.0 μm.

17. The heat deterioration resisting agent of claim 14, wherein the hydrotalcite particles have a specific surface area measured by a BET method of 5 to 20 m²/g.

18. The heat deterioration resisting agent of claim 14, wherein the hydrotalcite particles have a ratio of a specific surface measured by the BET method to a specific surface area measured by a Blaine method of 1 to 6.

19. The heat deterioration resisting agent of claim 14, wherein the hydrotalcite particles contain an iron compound and a manganese compound in a total amount of 0.01 wt % or less in terms of metals (Fe+Mn).

20. The heat deterioration resisting agent of claim 14, wherein the hydrotalcite particles have a total content of an iron compound, manganese compound, cobalt compound, chromium compound, copper compound, vanadium compound and nickel compound of 0.02 wt % or less in terms of metals.

21. The heat deterioration resisting agent of claim 14, wherein the hydrotalcite particles are dehydrated at a temperature of 150 to 300° C.

22. A method for suppressing heat deformation of a synthetic resin during thermal molding thereof, comprising forming a molding composition by adding a heat deformation suppressing effective amount of the heat deterioration resisting agent of claim 1 to the synthetic resin and thermally molding the resulting molding composition.

23. The synthetic resin composition of claim 1, wherein A is at least one anion selected from the group consisting of $ClO_4^-$, $SO_4^{2-}$ and $CO_3^{2-}$.

24. The heat deterioration resistant agent according to claim 14, wherein A is at least one anion selected from the group consisting of $ClO_4^-$, $SO_4^{2-}$ and $CO_3^{2-}$.

25. The method according to claim 22, wherein in said heat deterioration agent, A is at least one anion selected from the group consisting of $ClO_4^-$, $SO_4^{2-}$ and $CO_3^{2-}$.

* * * * *